United States Patent [19]
Klein et al.

[11] Patent Number: 5,143,185
[45] Date of Patent: Sep. 1, 1992

[54] CONTROLLABLE HYDRAULIC VIBRATION DAMPER FOR AUTOMOTIVE VEHICLES

[75] Inventors: Hans-Christof Klein, Hattersheim; Uwe Sievers, Darmstadt, both of Fed. Rep. of Germany

[73] Assignee: Alfred Teves GmbH, Frankfurt Am Main, Fed. Rep. of Germany

[21] Appl. No.: 726,148

[22] Filed: Jun. 28, 1991

Related U.S. Application Data

[63] Continuation of Ser. No. 383,776, Jul. 21, 1989, abandoned.

[30] Foreign Application Priority Data

Aug. 11, 1988 [DE] Fed. Rep. of Germany ....... 3827255

[51] Int. Cl.⁵ ................... F16F 9/46; B60G 17/08
[52] U.S. Cl. ................... 188/299; 188/315; 188/322.14
[58] Field of Search ........... 188/299, 315, 319, 322.14; 267/64.26

[56] References Cited

U.S. PATENT DOCUMENTS

| | | | |
|---|---|---|---|
| 2,538,375 | 1/1951 | Montgomery | 188/274 |
| 3,047,309 | 7/1962 | Nallinger et al. | |
| 4,606,440 | 8/1986 | Buchanan, Jr. et al. | 188/299 X |
| 4,709,791 | 12/1987 | Houghton | 188/322.14 X |
| 4,732,408 | 3/1988 | Ohlin | 188/299 X |
| 4,813,519 | 3/1989 | Matsubara et al. | 188/299 |
| 4,834,088 | 5/1989 | Jeanson | 188/299 |
| 4,872,537 | 10/1989 | Warner | 267/64.26 X |

FOREIGN PATENT DOCUMENTS

| | | |
|---|---|---|
| 0237085 | 9/1987 | European Pat. Off. |
| 1430051 | 10/1968 | Fed. Rep. of Germany ........ 188/322.14 |
| 1405781 | 6/1970 | Fed. Rep. of Germany . |
| 3215614 | 2/1983 | Fed. Rep. of Germany . |
| 3406875 | 9/1985 | Fed. Rep. of Germany . |
| 3434877 | 4/1986 | Fed. Rep. of Germany . |
| 3500601 | 7/1986 | Fed. Rep. of Germany . |
| 3719113 | 8/1988 | Fed. Rep. of Germany . |
| 2560325 | 8/1985 | France . |
| 2596124 | 9/1987 | France . |
| 0621630 | 4/1949 | United Kingdom ........... 188/322.14 |
| 939511 | 10/1963 | United Kingdom . |
| 1108266 | 4/1968 | United Kingdom . |
| 1185074 | 3/1970 | United Kingdom . |
| 1354385 | 5/1974 | United Kingdom . |
| 2194309 | 3/1988 | United Kingdom . |
| 8504698 | 10/1985 | World Int. Prop. O. . |

*Primary Examiner*—Robert J. Oberleitner
*Assistant Examiner*—Peter M. Poon
*Attorney, Agent, or Firm*—Robert P. Seitter; J. Gordon Lewis

[57] ABSTRACT

A controllable hydraulic vibration damper for automotive vehicles comprising a working cylinder which contains damping fluid and which is subdivided into two working chambers by a damping piston with a piston rod, the damper comprising at least one channel disposed outside of the working chambers, a valve assembly having at least one controllable valve, and a compensating chamber, which vibration damper is a simple structure and has an optimal control for the rebound and compression travel, and a first working chamber in permanent communication with the channel and the compensating chamber, while the second working chamber is connected with the channel and the compensating chamber by a valve assembly including an electronically and a series of one way acting valves.

7 Claims, 3 Drawing Sheets

CONTROLLABLE HYDRAULIC VIBRATION DAMPER FOR AUTOMOTIVE VEHICLES

This application is a continuation of application Ser. No. 07/383,776 filed Jul. 21, 1989, now abandoned.

BACKGROUND OF THE INVENTION

The present invention relates to a controllable hydraulic vibration damper for automotive vehicles. A like vibration damper is disclosed in German published patent application No. 34 06 875. One working chamber in the vibration damper disclosed therein communicates permanently with a channel. yet the connection between the channel and the compensating chamber is controlled by a magnet valve. The other working chamber is, via bottom valves, in communication with the compensating chamber which, in turn, is connectible with the channel via the magnet valve. The damping force of this controller is substantially determined by the characteristic curve of the invariably set damping valves. Solely the compensating volume displaced by the piston rod is available as a controllable fluid flow. This bypass control allows the damper's initial adjustment to vary only to a minor degree.

Therefore, it is an object of the present invention to provide a vibration damper according to the species which is of a simple structure and whose damping characteristic curve is variable over wide ranges.

SUMMARY OF THE INVENTION

This object is achieved by providing a controllable hydraulic vibration damper for automobiles wherein a regulation of damping force is possible with only one controllable valve both for the compression travel and for the rebound travel, with the amount of the controllable rate of fluid flow in the regulating valve being dictated by the volume to be displaced stroke-responsively from one working chamber into the next one.

An inventive variant provides that the compensating chamber does not communicate directly with the channel, but that a non-return valve is inserted into the communication between the compensating chamber and the channel, which closes the direction of flow from the channel towards the compensating chamber. It is ensured thereby that the controllable valve can always regulate the fluid flow out of the pressure-loaded working chamber and does not serve a suction regulation. Apart from avoiding cavitation problems, this design also augments in a favorable manner the range of the maximum effective pressure difference.

Both variants ensure that the total damping fluid volume to be displaced always takes its course through the channel. This accomplishes a particularly effective cooling of the damping fluid.

An advantageous embodiment of this invention provides that the controllable valve is arranged inside a hydraulic rectifier circuit arrangement so that it is penetrated by fluid only in one direction irrespective of the direction of stroke of the working piston. This allows the use of a regulating valve of a particularly simple design. A practical embodiment of this invention provides that the channel is formed by the free cross-section between the working cylinder and a hollow body encompassing the latter. Preferably, a tube or a hollow rod with a triangular cross-section is used as a hollow body.

An embodiment of this invention which is especially preferred from the point of view of manufacturing technology provides that the valve assembly is integrated as a preassembled assembly unit into a closure member axially confining the second working chamber. Besides, this assembly unit can serve as a boundary between the channel and the compensating chamber. Moreover, a very favorable guidance of control cable and energy supply cable is possible owing to this arrangement of the valve assembly.

A particularly suitable design of the compensating chamber provides that the latter is confined by a movable wall, and that a partially load-bearing vibration damper can be designed in that this movable wall is elastically preloaded.

When at least one invariably set damping valve is comprised within the valve assembly, which valve is either connected in parallel or in series with the controllable valve, a minimum damping force can be safeguarded even upon failure of the controllable valve. This controllable valve can be designed as a digitally or analogously controlled valve. Advantageously, the controllable valve is composed of an anticipatorily controlling pilot valve and a main valve. It is particularly expedient when the pilot valve is designed as a slide valve which, even upon failure of its actuating means. guarantees a minimum damping force by being correspondingly preloaded.

To be able to use the hydraulic pressure of the working chambers as control variables for the controllable valve beside the varying driving dynamics parameters, it is an advantage to have a pressure sensor integrated in the valve assembly in such a way that it is always acted upon by the pressure of the respectively loaded working chamber. To this effect, the pressure sensor is connected to an electronic control unit which processes all input parameters and controls the controllable valve.

The present invention uses a damping piston in which no damping valves are incorporated. Hence, a light-weight piston can be employed and is of benefit in respect to costs and weight. Further favorable features can be taken from the following description of the invention with reference to the accompanying drawings.

DETAILED DESCRIPTION

Figure 1:
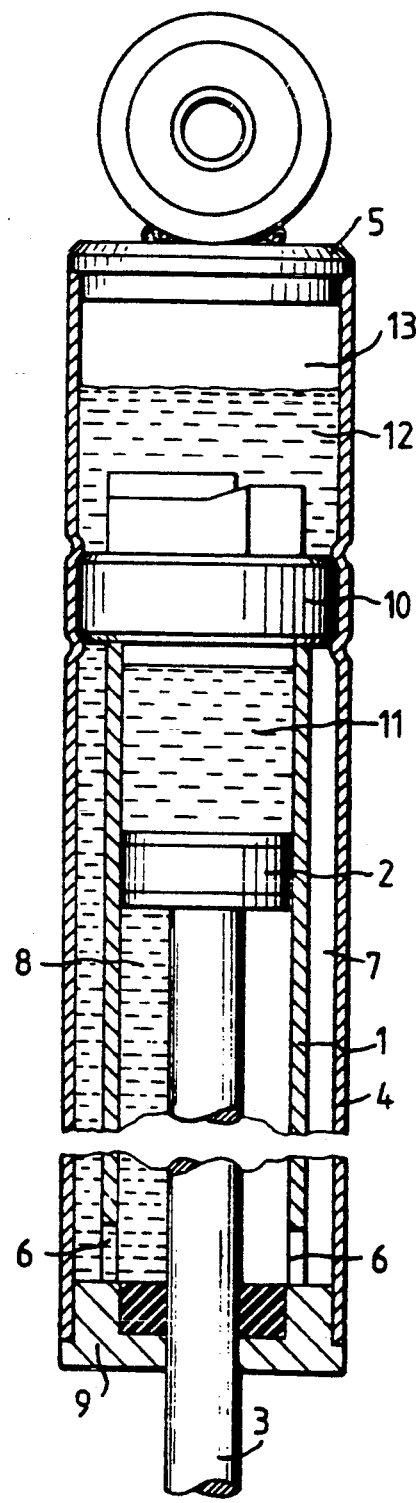
FIG. 1 is a longitudinal cross-section taken through an inventive vibration damper.

Identical parts have been assigned like reference numerals in all four Figures. According to FIG. 1, the vibration damper comprises a working cylinder 1 in which the damping piston 2 is axially slidably and sealedly guided, its piston rod 3 being coupled with part of the wheel suspension. The working cylinder 1 is enclosed by a tubular housing 4 whose upper cover 5 is connectible to the chassis by means of a fastening lug.

The annular space between the housing 4 and the working cylinder 1 forms a channel 7 which connects via the recesses 6 to the first working chamber 8. The bottom housing cover 9 bounds the first working chamber B in axial direction and guides the piston rod 3 sealedly in a central bore.

Disposed between the damping piston 2 and the valve plate 10 is the second working chamber 11. Said valve plate 10 is held by annularly circumferential indentations in the housing 4 and isolates both the working chamber 11 and the channel 7 from the compensating chamber 12 which is arranged between the valve plate 10 and the upper cover 5 in the housing 4.

A gas-filled pressure chamber 13 is partitioned off the compensating chamber by a diaphragm 13A. Apart from the illustrated design of the pressure chamber 13, the latter could also be of annularly circumferential design, and the diaphragm ends are secured to the upper cover, on the one hand, or to the valve plate, on the other hand.

Figure 2:
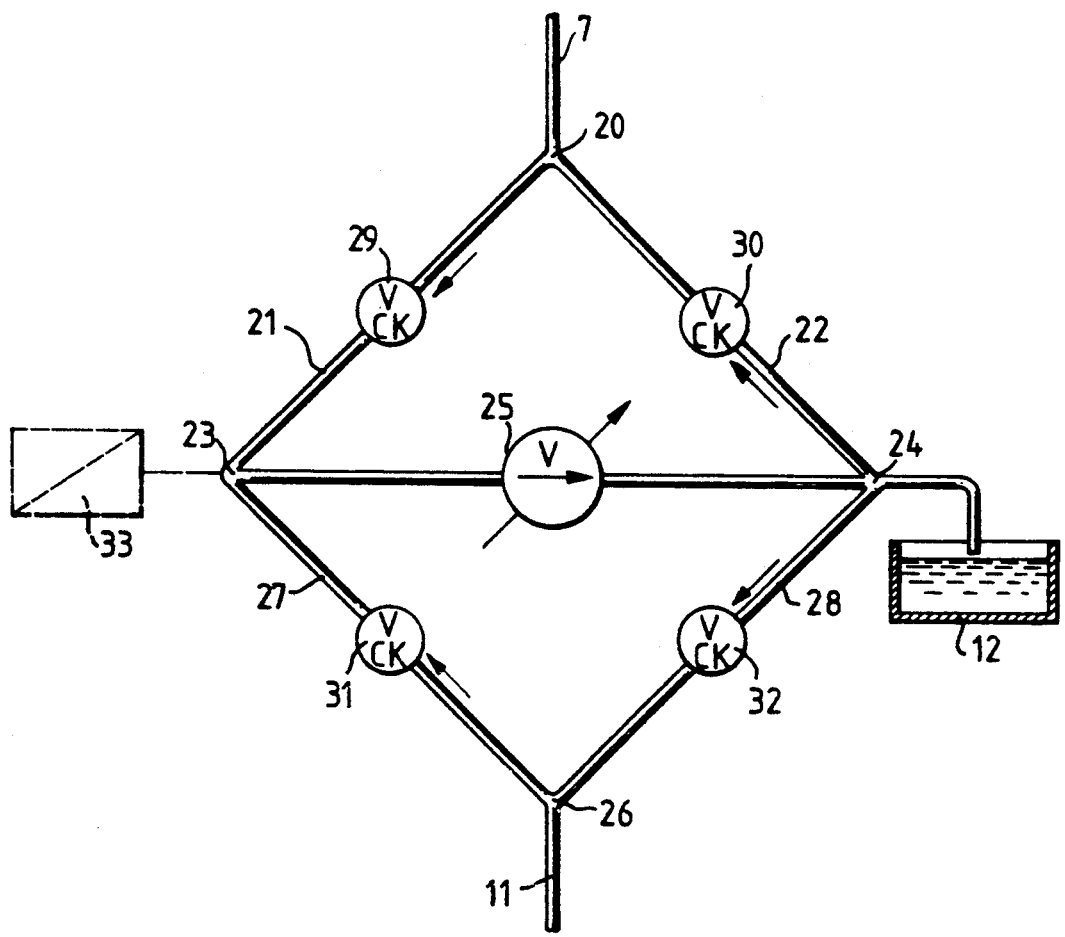
FIG. 2 shows a schematic flow diagram of the inventive valve assembly.

FIG. 2 shows the valve assembly arranged inside the valve plate 10. The valve assembly comprises a port 20 which communicates with the channel 7 and from which the connections 21 and 22 branch off to the junctions 23 and 24, respectively. Between the junctions 23 and 24, there is a connection which is controllable by way of the controllable valve 25. Controllable valve 25 can be designed as a digitally pulsating or analogously controlled valve, or as a diaphragm with a variable cross section.

Connected to the port 26 is the second working chamber 11. The connections 27 and 28 branch off to the junctions 23 and 24, respectively. The connection 21 comprises a non-return valve 29 which closes the direction of flow from the junction 23 to the port 20. In the connection 22, a non return valve 30 admits solely fluid flow from junction 24 to the port 20. The non-return valve 31 closes the direction of flow from junction 23 to port 26 in the connection 27, and the non-return valve 32 in the connection 28 prevents fluid flow from port 26 to junction 24.

This rectifier circuit arrangement ensures that the controllable valve 25 is penetrated by fluid always in the same direction, irrespective of the direction of stroke of the damping piston. Compensating chamber 12, too, can be connected to the port 20. Yet a preferred embodiment provides that the compensating chamber 12 is connected to junction 24, what permits an optimal regulation of damping hardness even if the vibration damper is of a non-load-bearing design or an only partially load-bearing design, since the communication from the working chambers to the compensating chamber must always lead via the controllable valve. Thus, fluid volume cannot be displaced into the compensating chamber in an "uncontrolled" fashion.

When an electronic control unit 33, including a pressure sensor is connected to the junction 23, it is guaranteed that the pressure sensor is always acted upon by the pressure of the respectively loaded working chamber.

Figure 3:
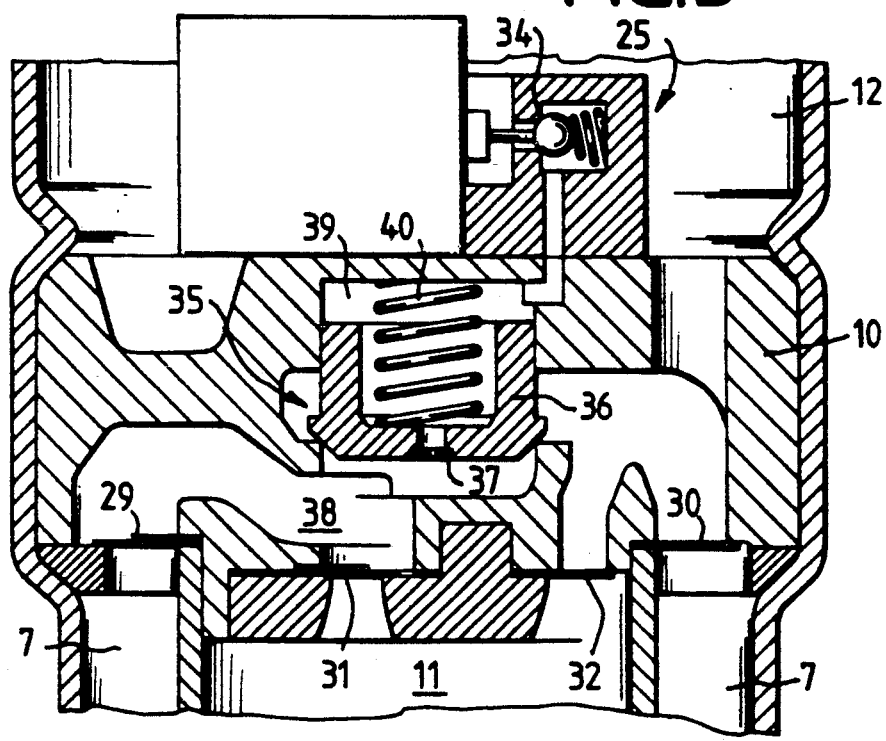
FIG. 3 is a partial cross-section taken through a first embodiment of the valve assembly.

FIG. 3 shows a constructive design of the valve assembly integrated in the valve plate 10. According to this design, the non-return valves 29, 30, 31, 32 are clamped-in spring steel laminas, and as best illustrated in FIG. 4 the non-return valves 29 and 31 are reinforced by additional spiral springs in order to accomplish a supply restriction of the fluid flow exiting from one of the working chambers.

The controllable valve 25 is composed of the electro-magnetically actuatable pilot valve 34 and the main valve 35. In the illustrated design, the pilot valve is depicted as a seat valve, for the sake of simplicity. The main valve 35 is designed as a seat valve, while the spring-loaded valve closure member 36 includes a throttle 37 which connects chamber 38, which is constantly acted upon by the pressure of the respectively loaded working chamber, to the control chamber 39 of the main valve 35. Control chamber 39 communicates via a channel with the pilot valve 34. Via said pilot valve 34, control chamber 39 is connectible to the compensating chamber 12. The pressure sensor in unit 33 is arranged in chamber 3B at any desired location.

During operation of the vibration damper, the damping fluid displacing from the respectively loaded working chamber will act upon the valve closure member 36 in opposition to the force of the spring 40 irrespective of the stroke direction via one of the two non-return valves 29 and 31, respectively, and via the chamber 38. As long as the connection between the control chamber 39, and the compensating chamber 12 is closed by the pilot valve 34, the valve closure member 36 is unable to lift from its seat so that the passage is closed from the chamber 38 to the compensating chamber 12 and thus to the non-loaded working chamber. By corresponding operation of the pilot valve 34, any variable flow cross-section between chamber 3B and the compensating chamber 12 and thus a damping force depending upon this flow cross-section can be adjusted. The controllable valve 25 may comprise a diaphragm with a variable cross section opening provided therein. The controllable valve 25 then operates to throttle the fluid flow out of the pressure-loaded working chamber by varying the cross section opening provided therein. The damping and control characteristics can be optimized in addition by a corresponding geometrical design of the valve closure member 36 and/or its valve seat.

Figure 4:
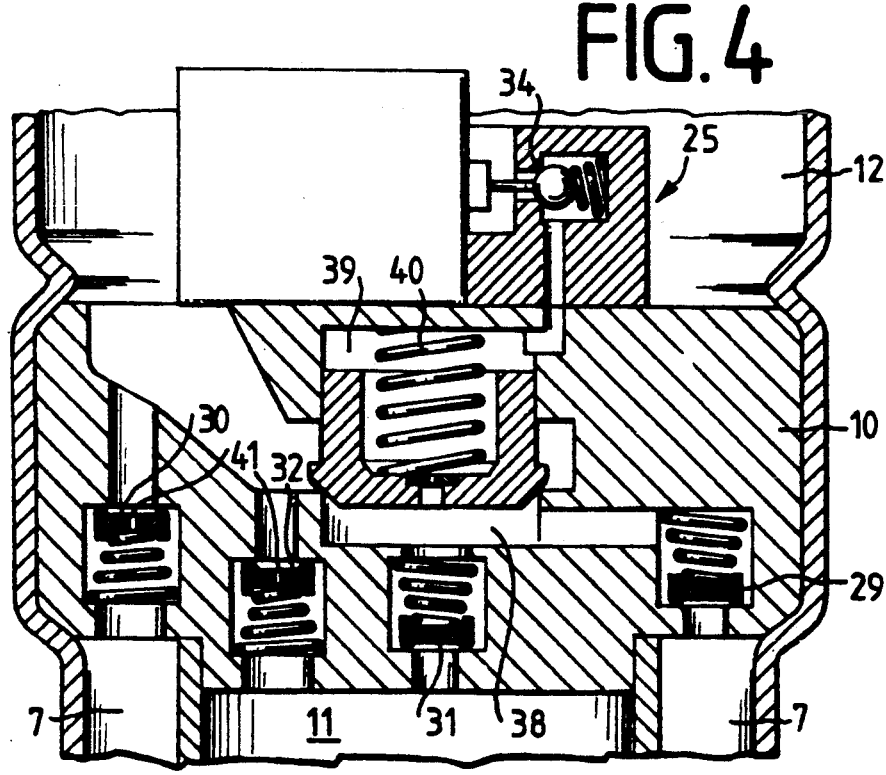
FIG. 4 is a partial cross-section taken through a second embodiment of the inventive valve assembly.

FIG. 4 shows a design of the valve assembly with non-return valves 29A, 30A, 31A, 32A which are each formed as spring-loaded seat valves. For the supply restriction, as has been described already by way of FIG. 3, the springs of the non-return valves 29A and 31A can have a greater rigidity. The non-return valves 30A and 32A contain small-diameter bypass bores 41 in order to render possible a pressure balance between the two working chambers, e.g., when the vehicle is at standstill with the ignition system switched off and the pilot valve 34 closed. Owing thereto, the vibration damper can react to load variations even when the vehicle's engine is switched off. Damping fluid displacement is possible even in the presence of extremely low damping piston speeds. Corresponding bypass bores can also be comprised in the non-return valves according to FIG. 3 which are designed as metal laminas. The mode of operation of the valve assembly corresponds to the version shown in FIG. 3.

What is claimed is:

1. A controllable hydraulic damper for automotive vehicles comprising:
    a tubular housing having a first cover means at one end;
    a valve assembly housing fixed within said housing spaced from said first cover means to define a compensating chamber therebetween within said tubular housing, said compensating chamber containing hydraulic fluid;
    a working cylinder fixed at one end to said valve assembly housing and extending to the other end of said tubular housing;
    a second cover means closing the other end of each of said tubular housing and said working cylinder;
    a piston slidably mounted in said working cylinder;

a piston rod fixed to said piston and extending to said other end of said working cylinder and out through said second cover means;

a channel within said tubular housing and outside of said working cylinder extending to said valve assembly housing;

said piston defining a first working chamber defined in said working cylinder between said piston and said valve assembly housing;

a second working chamber defined in said working cylinder between said piston and said second cover means hydraulic fluid disposed in said first and second working chambers;

at least one recess placing said second working chamber in constant communication with said channel;

a common chamber defined in said valve assembly housing;

a first one way acting valve means in said valve assembly housing allowing pressurized hydraulic fluid to pass into said common chamber from said first working chamber when said piston is moved towards said first working chamber while preventing reverse flow therefrom;

a second one way acting valve means in said valve assembly housing allowing pressurized fluid from said second working chamber to pass into said common chamber by way of said channel when said piston moves towards said second working chamber, while preventing reverse flow therefrom;

a controllable valve in said valve assembly controllably establishing a varying degree of restrictive communication between said common chamber and said compensating chamber;

a third one way acting valve means in said valve assembly housing allowing hydraulic fluid to be drawn into said first working chamber from said compensating chamber when said piston is moved away from said first working chamber while preventing reverse flow therefrom; and a fourth one way acting valve means in said valve assembly housing allowing hydraulic fluid to be drawn into said second working chamber by way of said channel from said compensating chamber when said piston moves away from said second working chamber while preventing reverse flow therefrom, whereby said controllable valve provides varying degrees of restriction over flow from both said first and second working chambers.

2. The controllable hydraulic damper according to claim 1, wherein said controllable valve includes an electromagnetically operated pilot valve and a main valve controlled by said pilot valve.

3. The controllable hydraulic damper according to claim 2, wherein each of said one way acting valve means including a valve element and an associated valve port, and spring means imaging said valve element onto said valve port, and wherein said first and second one way acting valve means have stronger spring means than said third and fourth spring means.

4. The controllable hydraulic damper according to claim 3, wherein a small bypass bore is formed in each valve element of said third and fourth one way acting valve means allowing pressure equalization when said pilot valve is closed.

5. The controllable hydraulic damper according to claim 1, wherein said channel comprises an annular space between said tubular housing and said working cylinder.

6. The controllable hydraulic damper according to claim 1, wherein said valve assembly housing is mounted in said tubular housing by formed indentations in said tubular housing.

7. The controllable hydraulic damper according to claim 1, wherein said third and fourth one way acting valve means communicate directly with said compensating chamber.

* * * * *